(12) United States Patent
Kato

(10) Patent No.: US 6,985,258 B1
(45) Date of Patent: Jan. 10, 2006

(54) PRINT SYSTEM

(75) Inventor: Takashi Kato, Nagano (JP)

(73) Assignee: Seiko Epson Corporation, Tokyo (JP)

(*) Notice: Subject to any disclaimer, the term of this patent is extended or adjusted under 35 U.S.C. 154(b) by 936 days.

(21) Appl. No.: 09/713,254

(22) Filed: Nov. 16, 2000

(30) Foreign Application Priority Data

Nov. 19, 1999 (JP) .............................. P.11-328902

(51) Int. Cl.
*H04N 1/40* (2006.01)

(52) U.S. Cl. ...................................... 358/3.07; 358/2.1

(58) Field of Classification Search ................ 358/1.2, 358/1.9, 3.06–3.12, 528, 449–451, 426.01–426.11, 358/539; 382/296–300
See application file for complete search history.

(56) References Cited

U.S. PATENT DOCUMENTS

| 4,729,034 A | * | 3/1988 | Roberts et al. | ........ 358/426.02 |
| 5,097,518 A | * | 3/1992 | Scott et al. | ................. 382/298 |
| 5,483,354 A | * | 1/1996 | Kessels et al. | ............. 358/444 |
| 6,219,129 B1 | * | 4/2001 | Kinjo et al. | .................. 355/40 |

FOREIGN PATENT DOCUMENTS

| JP | 2-265375 | | 10/1990 |
| JP | 4-25280 | | 1/1992 |
| JP | 04220366 A | * | 8/1992 |
| JP | 7-87300 | | 3/1995 |
| JP | 7-87303 | | 3/1995 |
| JP | 9-81763 | | 3/1997 |

* cited by examiner

*Primary Examiner*—Thomas D. Lee
*Assistant Examiner*—Stephen Brinich
(74) *Attorney, Agent, or Firm*—Sughrue Mion, PLLC

(57) ABSTRACT

Image data read by an image read section and digitized is temporarily retained in an input buffer of a printer. A control section determines the contents of image processing based on print setting specified from an instruction section and controls the compression and decompression timings of the image data in response to the image processing contents. To execute enlargement processing, the image data is compressed and stored, then enlarged; to execute reduction processing, the image data is reduced, then compressed and stored, whereby the memory resources can be used effectively.

18 Claims, 6 Drawing Sheets

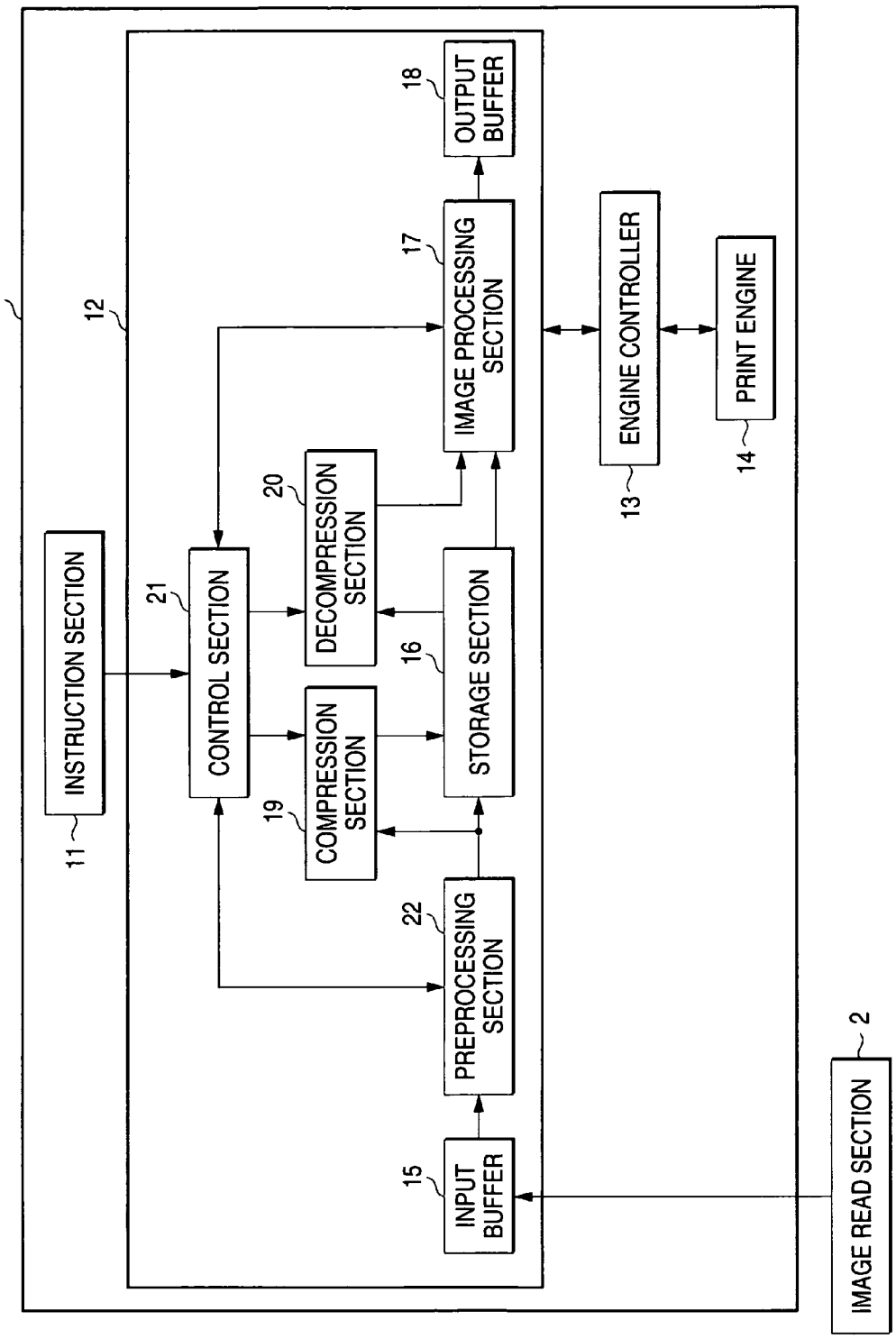

ENLARGEMENT SPLIT PRINT

REDUCTION INTEGRATION PRINT

PRINT SYSTEM

BACKGROUND OF THE INVENTION

1. Field of the Invention

This invention relates to a print system having an image read function, such as a copier or a printer with a scanner.

The present application is based on Japanese Patent Applications No. Hei. 11-328902, which is incorporated herein by reference.

2. Description of the Related Art

For example, a print system of a copier, etc., scans a print, a photo, etc., placed on an original bed by an image read section made up of CCD elements, etc., and converts the print, the photo, etc., into image data as digital data. The image data is sent, for example, to a laser beam print engine, etc., for printing.

On the other hand, the source print, etc., may be enlarged or reduced rather than printed intact as a copy. To enlarge or reduce the source in printing, the source image is optically enlarged or reduced and read or image processing of interpolation, thinning out, etc., is applied to the image data for generating enlarged or reduced print image data.

Further, as an application example of reduction print, if a plurality of prints are placed on an original bed and reduction print is executed, they can also be arranged collectively on one page.

By the way, to enlarge and print a source print, the source print cannot be enlarged exceeding the printable paper size with a print engine although it depends on the scaling factor. On the other hand, to reduce and print a plurality of source prints collectively on one page, the source prints need to be arranged on an original bed. That is, as many source prints as can be placed on the original bed can only be arranged collectively on one page.

If an automatic paper feeder, etc., is used, a plurality of source prints can be read in order and converted into image data. Thus, if a plurality of source prints cannot be placed on the original bed at a time, they may be able to be printed collectively on one page. In this case, however, the image data of the source prints must be retained and thus they may or may not be able to be printed collectively on one page depending on the installed memory capacity. Particularly, in recent years, color printing has become widely prevalent; the data amount of a color original is large. Therefore, it is difficult to reduce and print a large number of source prints collectively on one page; if the installed memory capacity is increased, costs are increased drastically.

SUMMARY OF THE INVENTION

It is therefore an object of the invention to provide a print system that can execute enlargement print and reduction print with a small memory capacity. It is another object of the invention to provide a print system that can execute enlargement split print and reduction integration print with a small memory capacity.

To the end, in the invention, the compression and decompression timings of image data are controlled in response to the image processing contents of enlargement, reduction, etc.

That is, according to the invention, there is provided a print system for printing read image data based on specified print setting, the print system comprising instruction means for specifying print setting, image read means for reading an original image and converting the image into image data, compression means for compressing the read image data and storing the compressed data in storage means, decompression means for reading the compressed image data from the storage means and decompressing the data, image processing means for performing predetermined image processing for the image data based on the specified print setting, thereby preparing print image data, and control means for controlling compression and decompression timings of the image data in response to the contents of the image processing performed by the image processing means.

The "print setting" means various pieces of setting information of the print mode of enlargement, reduction, etc., the number of print sheets, etc., for example. As the "image read means," a scanner, a digital still camera, etc., can be adopted, for example. As the "predetermined image processing," enlargement, reduction, image layout, etc., can be named, for example.

The user sets the number of print sheets, the scaling factor, etc., through the instruction means. The control means detects the image processing contents based on the specified print setting and controls the compression and decompression timings of the image data in response to the image processing contents. That is, for example, to execute enlargement processing, the read image data can be compressed, then enlarged; to execute reduction processing, the read image data can be reduced, then compressed, whereby the memory resources can be used effectively in response to the image processing contents.

That is, the image processing contains enlargement processing and reduction processing of the image data, and the control means, (1) if the image data undergoes the enlargement processing, (1a) may cause the compression means to compress and store the image data read by the image read means, (1b) cause the decompression means to decompress the compressed image data, then (1c) cause the image processing means to perform enlargement processing of the image data; (2) if the image data undergoes the reduction processing, (2a) may cause the image processing means to perform reduction processing of the image data read by the image read means, then (2b) cause the compression means to compress and store the image data.

Thus, in the enlargement processing, the image data is once compressed and stored, then enlarged, so that the used memory capacity can be reduced as compared with the case where the image data is enlarged, then compressed and stored. In the reduction processing, the read image data is reduced, then compressed and stored, so that the memory resources can be used effectively.

The image processing further contains enlargement split processing of performing image layout so as to split enlarged image data into a plurality of print record media for printing and reduction integration processing of performing image layout so as to print reduced image data collectively on one print record medium, and the control means (1) if the image data undergoes the enlargement split processing, (1a) may cause the compression means to compress and store the image data read by the image read means, (1b) cause the decompression means to decompress the compressed image data, then (1c) cause the image processing means to perform enlargement processing and enlargement split processing of the image data; (2) if the image data undergoes the reduction integration processing, (2a) may cause the image processing means to perform reduction processing for the image data read by the image read means, then (2b) cause the compression means to compress and store the reduced image data, and (2c) cause the decompression means to decompress the compressed image data and then cause the image processing means to perform reduction integration processing of the image data.

Thus, the enlargement split print and the reduction integration print can be accomplished with less memory recourses.

Further, the print system may further include determination means for determining whether or not a blank page occurs to perform the enlargement split processing, wherein if it is determined that a blank page occurs, the control means can also cancel print of the blank page.

For example, a page not printed at all can occur depending on placement of the image to be printed, setting of the scaling factor, etc. Then, the determination means determines whether or not a blank page occurs and if it is determined that a blank page occurs, the control means cancels print of the blank page. Here, for example, a page where a predetermined number or more of pieces of data of a predetermined gradation value or more do not appear can be assumed to be a blank page.

The compression means can compress the image data with more than one compression quality and can also select the compression quality to be used in response to the contents of the image processing.

Here, the "compression quality" also contains non-compression. The compression quality can also be realized with a single compression algorithm by changing the setup value and can also be realized by selecting an appropriate one of a plurality of compression algorithms different in compression quality.

For example, JPEG, GIF, run length, etc., can be named as the compression algorithms. The compression means dynamically selects the compression quality to be used in response to the contents of the image processing. For example, to perform the reduction processing, compression quality with a small data loss at the decompression time can be selected, whereby a furthermore data loss of the thinned-out and reduced image data can be prevented. In contrast, to perform the enlargement processing, compression quality with a comparatively large data loss can be adopted. Run length can be named as an example of a compression algorithm for realizing compression quality with a small data loss (reversible compression). JPEG can be named as an example of a compression algorithm for realizing compression quality with occurrence of a data loss (irreversible compression). In the reduction processing, the image data can also be stored without being compressed.

For example, compression quality can be selected in any of the following modes: First, an image quality priority mode is available. By way of example, a compression algorithm with a small data loss (containing non-compression) is selected to compress reduced image data. Second, a memory efficiency priority mode is available. By way of example, a compression algorithm with high memory use efficiency is selected to perform image layout processing. Third, a processing speed priority mode is available. For example, if image data can be stored in memory simply by performing reduction processing, any other subsequent data processing is executed without performing compression processing.

The invention can also be understood as a print method or a record medium recording a computer program. The program can be fixed on various tangible record media of hard disk, floppy disk, memory, etc., for example. In addition, a communication medium can also be used in such a manner that a predetermined program is downloaded from a server on a network, for example.

Features and advantages of the invention will be evident from the following detailed description of the preferred embodiments described in conjunction with the attached drawings.

BRIEF DESCRIPTION OF THE DRAWINGS

In the accompanying drawings:

FIG. 1 is a block diagram of a print system according to a first embodiment of the invention;

DETAILED DESCRIPTION OF THE PREFERRED EMBODIMENTS

Figure 2A:
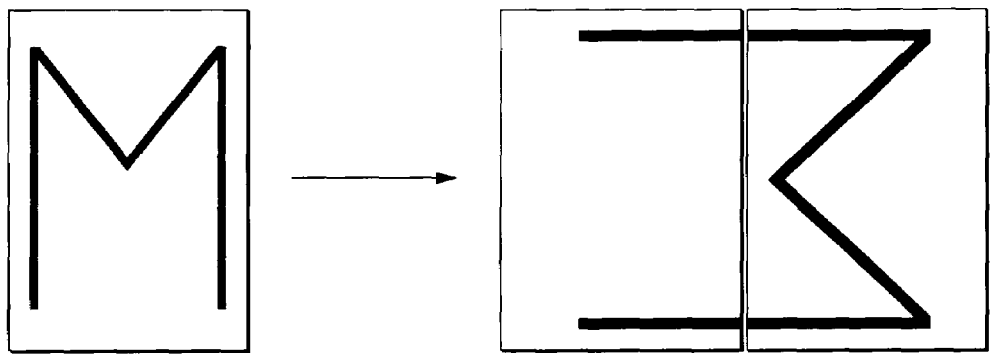
FIGS. 2A and 2B are schematic representations to schematically show enlargement split print and reduction integration print.

Referring now to the accompanying drawings (FIGS. 1 to 6), there are shown preferred embodiments of the invention.

1. First Embodiment

FIG. 1 is a block diagram to show the general configuration of a print system according to a first embodiment of the invention.

The print system according to the embodiment comprises a printer 1implemented, for example, as a color laser printer, a color ink jet printer, or the like and an image read section 2 1implemented, for example, as a scanner, a digital camera, or the like. The image read section 2 as "image read means" may be integral with the printer 1 or may be separate from the printer 1.

The printer 1 comprises an instruction section 11, a printer controller 12, an engine controller 13, and a print engine 14. The instruction section 11 as "instruction means" can be provided on an operation panel of the printer 1, for example. Alternatively, it can also be placed in a host computer. The user can set the print mode of enlargement or reduction, the scaling factor, the number of copies, etc., through the instruction section 11.

The printer controller 12 comprises an input buffer 15, a storage section 16, an image processing section 17, an output buffer 18, a compression section 19, a decompressing section 20, and a control section 21. Digital image data input from the image read section 2 is stored in the storage section 16 as "storage means" through the input buffer 15. The image processing section 17 as "image processing means" reads the image data stored in the storage section 16 and performs image processing for the image data for preparing print image data. For example, the image processing section 17 scales up or down the image size and performs image layout, color conversion, etc. The print image data prepared by the image processing section 17 is stored in the output buffer 18 and is input through the output buffer 18 to the engine controller 13. The engine controller 13 executes predetermined print by controlling drive of the print engine 14 based on the print image data.

The compression section 19 as "compression means" compresses the input image data according to a predetermined compression algorithm for reducing the data amount of the image data, then stores the compressed image data in the storage section 16. Here, the compression section 19 changes the compression algorithm to be used dynamically in response to the image processing contents. That is, to perform reduction processing, a compression algorithm with a little or no data loss at the decompression time is used to compress the image data to prevent a data loss from occurring in the already thinned-out image data. Alternatively, the image data can also be stored without being compressed. On the other hand, to perform enlargement processing, a compression algorithm for producing a data loss is used to compress and store the image data to decrease the used memory capacity. For example, run length can be named as a compression algorithm with a little data loss. For example, JPEG can be named as a compression algorithm for producing a data loss. To use an algorithm such as JPEG, the step size in a quantization table is changed, whereby the compression quality can be provided at multiple stages.

The decompression section 20 as "decompression means" reads and decompresses compressed image data from the data storage section 16 and inputs the decompressed image data into the image processing section 17. The control means 21 as "control means" controls the compression timing and the decompression timing in response to the image processing contents as described later. The compression section 19 and the decompression section 20 may be provided as hardware circuits or may be installed as computer programs.

A preprocessing section 22 is placed between the input buffer 15 and the storage section 16. The preprocessing section 22 thins out input image data and performs reduction processing, etc., for example, at the reduction integration print time. It can also be represented, for example, as "second image processing section."

Figure 2B:
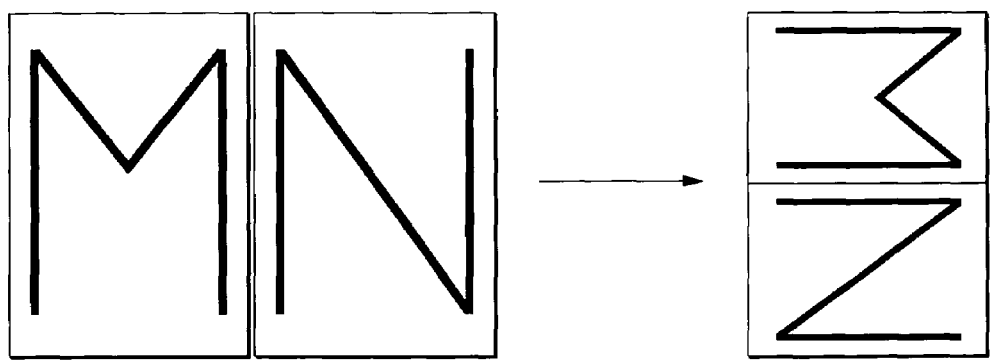

FIGS. 2A and 2B are schematic representations to show outlines of enlargement split print and reduction integration print. First, in the enlargement split print shown in FIG. 2A, the original image data shown on the left in the figure is split and output to a plurality of print record media, whereby print exceeding the paper size of the print engine 14 is accomplished. To execute the enlargement split print, processing of image size enlargement, image rotation, image layout to each page, etc., is performed as shown on the right of the figure. On the other hand, FIG. 2B shows reduction integration print. In the reduction integration print, a plurality of print data pieces as shown on the left of the figure are reduced and printed on one print record medium. To execute the reduction integration print, processing of image size reduction, image rotation, image layout in the page, etc., is performed as shown on the right of the figure.

Figure 3:
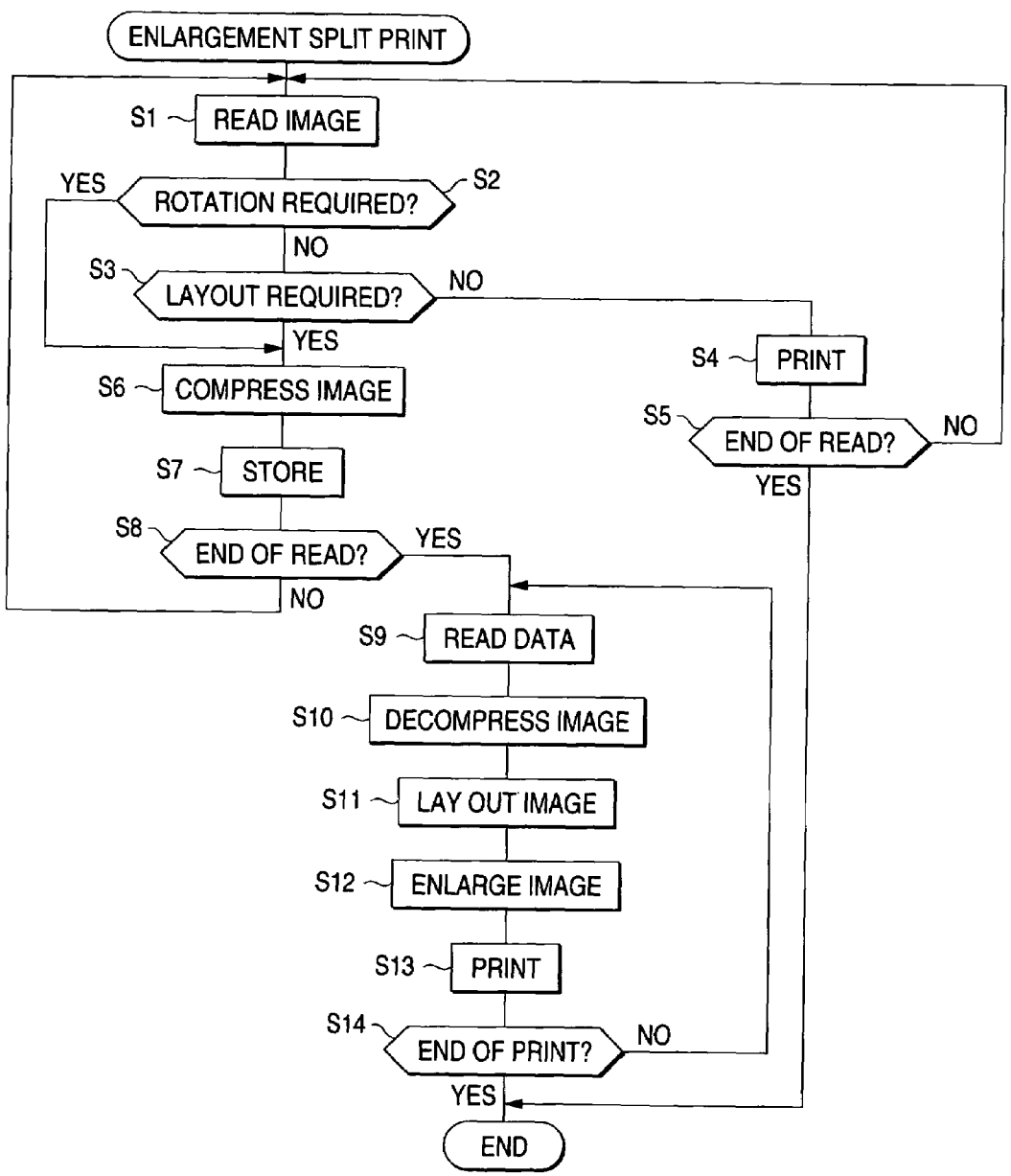
FIG. 3 is a flowchart to show enlargement split print processing.

Next, the operation of the print system of the embodiment will be discussed with reference to FIGS. 3 and 4. FIG. 3 is a flowchart to show the operation centering around enlargement split print processing.

First, the image data to be printed is read through the image read section 2 at step S1. Next, whether or not image rotation is required is determined based on print setting input from the instruction section 11 at step S2. If image rotation is not required, whether or not image layout is required is determined at step S3. Here, to execute the enlargement split print, the image data is output to a plurality of print record media and thus image layout processing becomes necessary. However, image layout is not required for simple equal-sized print, etc. If image layout is not required (NO at step S3), print image data is prepared and printed based on the read image data at step S4. Next, whether or not read of the image data terminates is determined at step S5. If it does not terminate, control returns to step S1 and new image data is read.

On the other hand, in the enlargement split print, image rotation processing often becomes necessary to execute printing exceeding the paper size. Even in normal enlargement print, enlargement printing can be executed, for example, if a A4-sized print record medium in portrait orientation is used in landscape orientation although it depends on the scaling factor. Therefore, for the enlargement split print, etc., YES is returned at step S2 or S3. Then, the read image data is compressed at step S6 and is stored in the storage section 16 at step S7. Next, whether or not read of the image data is complete is determined at step S8. If it is not complete, control returns to step S1 and the sequence is repeated until completion of reading the image data to be printed.

Upon completion of reading and compressing the image data (YES at step S8), control goes to a print process. That is, the compressed image data is read from the storage section 16 at step S9 and is decompressed at step S10. Various compression algorithms, such as run length, can be adopted.

The image processing section 17 lays out the image of the image data on each page based on the print setting at step S11. After the image layout is terminated, the size of each laid-out image is enlarged to the specified scaling factor and print image data is prepared at step S12 and is printed at step S13. The process at steps S9 to S13 is repeated until the enlargement split print is complete at step S14.

Figure 4:
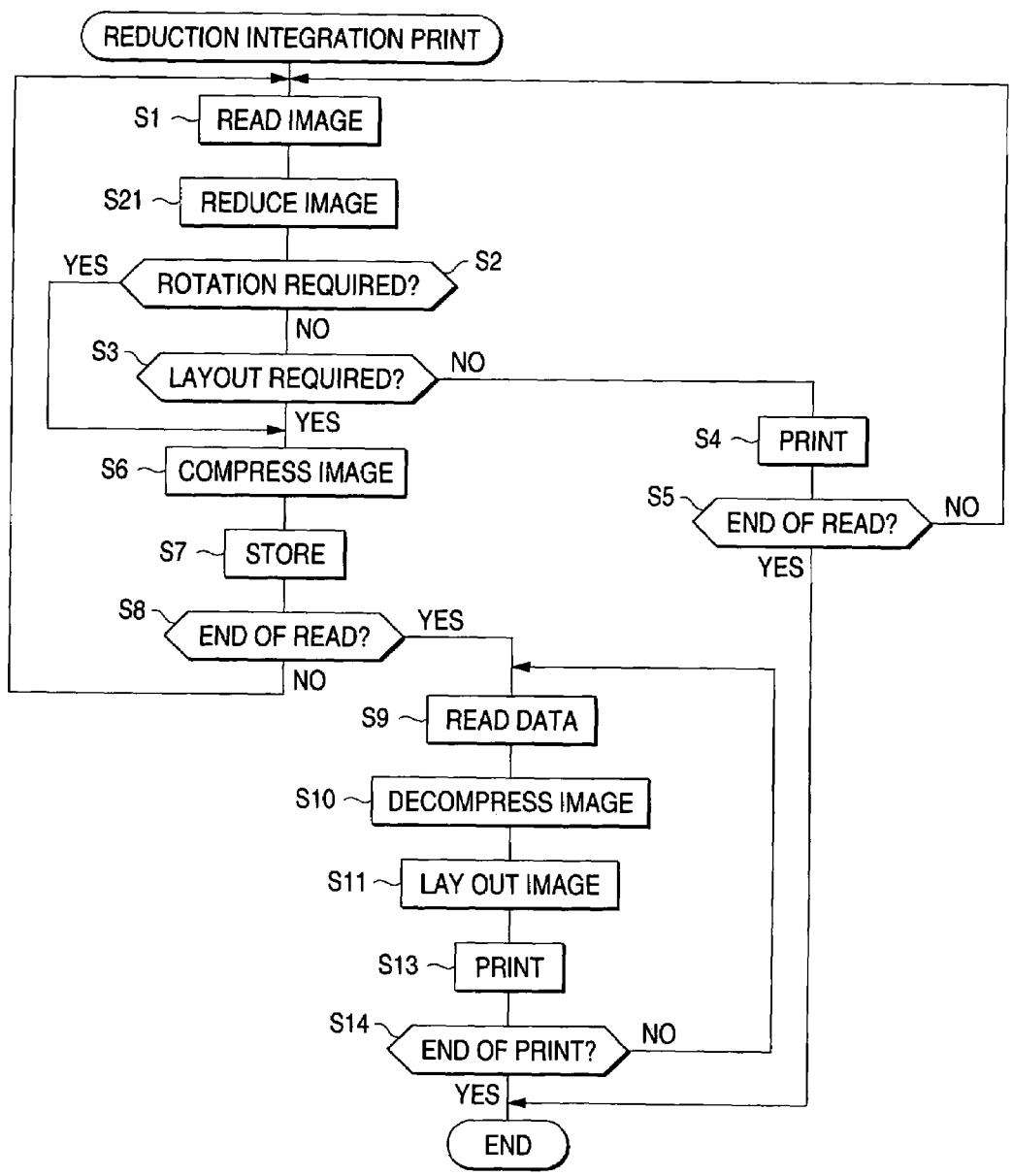
FIG. 4 is a flowchart to show reduction integration print processing.

Next, FIG. 4 is a flowchart to show the operation centering around reduction integration print processing. In the reduction integration print, a plurality of images are printed collectively on one print record medium. In the processing, when image data is read at step S1, it is reduced in size at step S21. After the image data is reduced for decreasing the data amount at step S6, the reduced image data is stored in the storage section 16 at step S7. Here, to compress and store the reduced image data, a reversible compression algorithm, such as run length, is used so as not to produce a data loss at the decompression time. Alternatively, if an increase in the data processing speed takes precedence, the image data can also be stored without being compressed.

The print system of the embodiment described provides the following advantages:

First, since the compression and decompression timings are controlled in response to the image processing contents, the storage section 16 can be used effectively in response to the contents of each image processing. That is, specifically, to execute enlargement print, image data is compressed and stored, then enlargement processing is performed; to execute reduction print, image data is reduced, then is compressed and stored, whereby the storage section 16 can be used effectively while degradation of the print quality is prevented.

Second, since the storage section 16 can be used effectively, enlargement split print and reduction integration print can be easily accomplished if the installed memory capacity is small.

Third, since a compression algorithm (compression quality) is selected dynamically in response to the image processing contents, compression and storage fitted to the processing contents can be executed. Specifically, to execute reduction processing, image data is compressed and stored according to a reversible compression algorithm, so that a new data loss can be prevented from occurring in the reduced image data thinned out at the preprocessing stage, and the print quality can be enhanced. To execute enlargement processing, occurrence of a data loss is allowed and an irreversible compression algorithm is adopted, thus the memory resources can be used effectively.

2. Second Embodiment

Next, a second embodiment of the invention will be discussed with reference to FIG. 5. Parts identical with those previously described with reference to the figures are denoted by the same reference numerals in the second embodiment and will not be discussed again. The embodiment is characterized by the fact that whether or not a blank page occurs is checked when enlargement split print is executed for preventing fruitless print.

Figure 5:
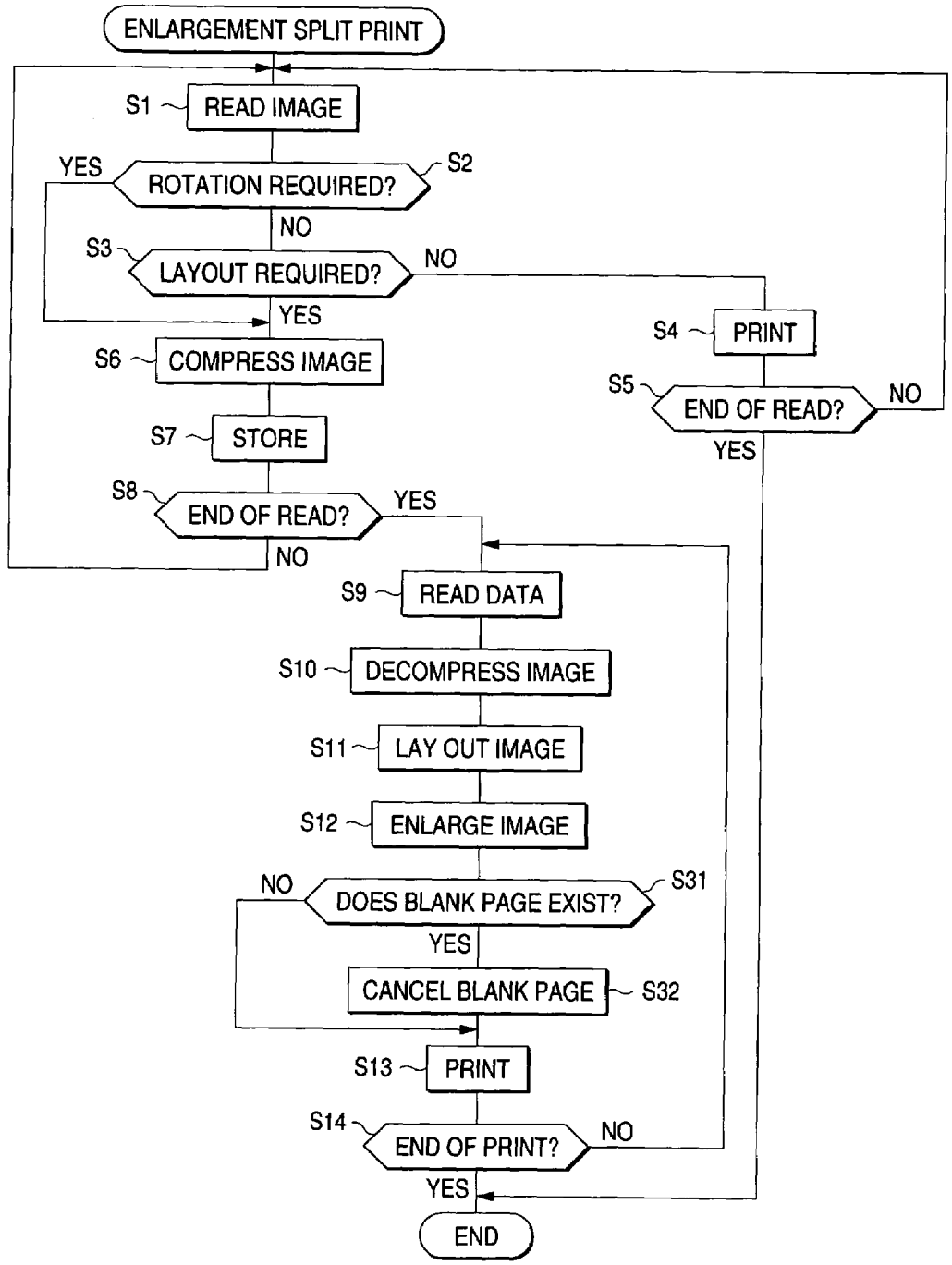
FIG. 5 is a flowchart to show enlargement split print processing of a print system according to a second embodiment of the invention.
Figure 6:
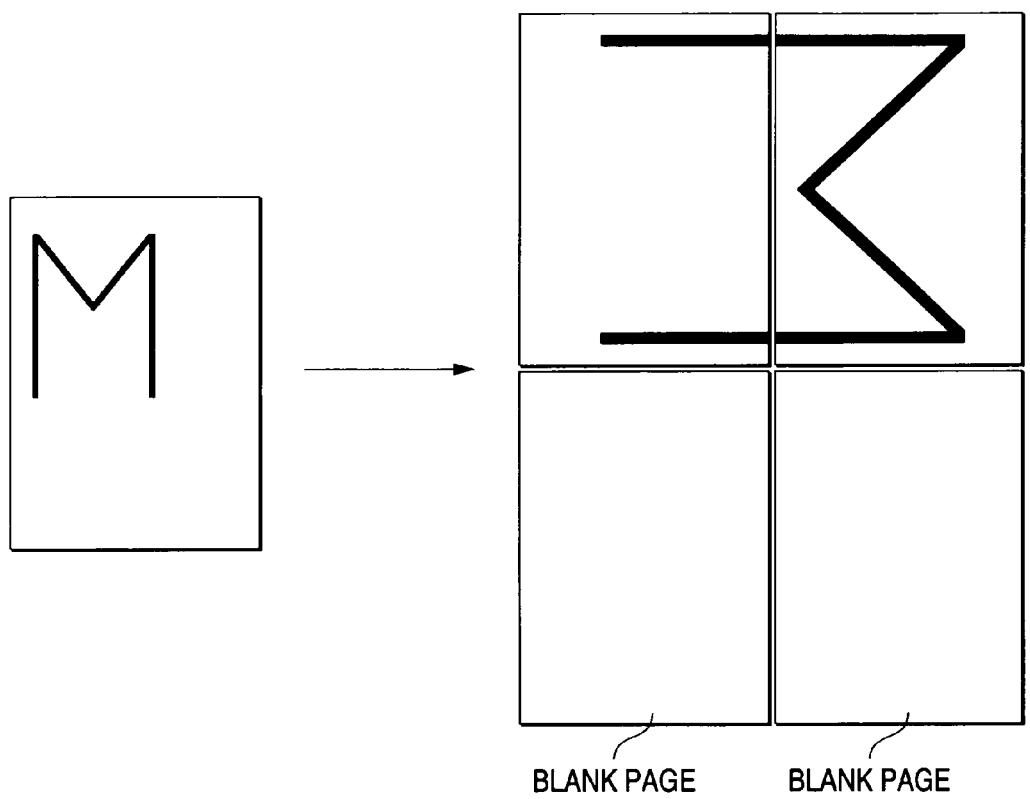
FIG. 6 is a schematic representation to show how a blank page occurs at the enlargement split print time.

FIG. 5 is a flowchart of enlargement split print processing in the second embodiment of the invention. The processing includes all steps of S1 to S14 shown in FIG. 3. In addition, in the processing, after termination of image layout and enlargement at steps S11 and S12, whether or not a blank page exists is determined at step S31 and if a blank page exists (YES at step S31), print of the black page is canceled at step S32. For example, as shown in FIG. 6, a blank page can occur as shown on the right of the figure depending on placement of the original image, specification of the scaling factor, etc. Then, at step S31, whether or not such a blank page occurs is checked for preventing fruitless print.

Here, various criteria can be adopted for determination as to whether or not a blank page exists. For example, a page with no print image data or a page of a predetermined amount or less of print image data can be canceled as a blank page. If dots scatter at a predetermined density or less even on a page with print image data, the page can also be handled as a blank page. The criterion for determination as to whether or not a blank page exists may be automatically set in response to the print quality, etc., or may be set manually by the user.

Even in the described embodiment, advantages similar to those of the first embodiment described above can be provided. In addition, in the second embodiment, at the enlargement split print time, whether or not a blank page occurs is checked and if a blank page exists, print of the page is canceled, so that fruitless print can be prevented.

It is understood by those skilled in the art that the foregoing description is preferred embodiments and that various changes and modifications may be made in the invention without departing from the spirit and scope thereof. For example, compression algorithm selection modes of an image quality priority mode, a memory efficiency priority mode, a processing speed priority mode, etc., may be provided for selecting an algorithm for each mode. For example, in the image quality priority mode, a high-quality algorithm is selected so as to prevent a data loss from occurring in reduced image data. For example, in the memory efficiency priority mode, an algorithm is selected so as to raise the memory use efficiency to perform image layout processing. In the processing speed priority mode, if image data can be stored in memory simply by performing reduction processing, subsequent data processing is performed without performing compression processing. Each mode can also be selected manually from a printer driver or a printer operation panel.

The invention can be applied not only to a print system comprising a separately installed printer and scanner connected via a network, but also to a complex machine comprising a printer and a scanner in one piece.

Further, in the reduction integration print, the boundary between reduced images is detected and print image data can also be prepared so as not to produce a splice between the reduced images.

As described above, according to the print system according to the invention, the compression and decompression timings of the image data can be controlled in response to the image processing contents, so that the memory resources of the storage means can be used effectively. Particularly, enlargement split print and reduction integration print can be realized with small memory resources.

What is claimed is:

1. A print system, for printing read image data based on specified print setting, comprising:
   instruction means for specifying print setting;
   image read means for reading an original image and converting the image into image data;
   image processing means for performing predetermined image processing for the image data based on the specified print setting;
   compression means for compressing one of the image data read by the image read means and the image data processed by the image processing means and storing the compressed data in storage means;
   decompression means for reading the compressed image data from the storage means and decompressing the data; and
   control means for controlling compression and decompression timings of the image data in response to contents of the image processing performed by said image processing means.

2. A print system according to claim 1, wherein:
   the image processing contains enlargement processing and reduction processing of the image data,
   said control means, when the image data undergoes the enlargement processing:
   (1a) causes said compression means to compress and store the image data read by said image read means;
   (1b) causes said decompression means to decompress the compressed image data; and then
   (1c) causes said image processing means to perform enlargement processing of the image data; and
   said control means, when the image data undergoes the reduction processing:
   (2a) causes said image processing means to perform reduction processing of the image data read by said image read means; and then
   (2b) causes said compression means to compress and store the image data.

3. A print system according to claim 2, wherein:
   the image processing further includes enlargement split processing of performing image layout so as to split enlarged image data into a plurality of print record media for printing;
   the image processing further includes reduction integration processing of performing image layout so as to print reduced image data collectively on one print record medium;
   said control means, when the image data undergoes the enlargement split processing:
   (1a) causes said compression means to compress and store the image data read by said image read means;
   (1b) causes said decompression means to decompress the compressed image data; and then
   (1c) causes said image processing means to perform enlargement processing and enlargement split processing of the image data; and said control means, when the image data undergoes the reduction integration processing:
(2a) causes said image processing means to perform reduction processing for the image data read by said image read means;
(2b) causes said compression means to compress and store the reduced image data; and then
(2c) causes said decompression means to decompress the compressed image data and then causes said image processing means to perform reduction integration processing of the image data.

4. A print system according to claim 1, wherein:
the system further comprises determination means for determining whether or not a blank page occurs to perform the enlargement split processing, and
when it is determined that a blank page occurs, said control means cancels print of the blank page.

5. A print system according to claim 1, wherein said compression means can compress the image data with more than one compression quality and selects the compression quality to be used in response to the contents of the image processing.

6. A print system according to claim 5, wherein said compression means selects compression quality with a small or no data loss at the decompression time to perform the reduction processing.

7. The print system according to claim 1, wherein, when the specified print setting indicates that an image layout is not required, the image processing is performed so that print image data, based on the input image data, is prepared without the compressing and decompressing.

8. A print method, for printing read image data based on specified print setting, comprising:
an enlargement print process and a reduction print process;
wherein said enlargement print process comprises:
inputting print setting concerning enlargement print;
reading an original image and converting the image into image data;
compressing the image data and storing the compressed data;
reading the compressed image data and decompressing the data; and
enlarging the decompressed image data and preparing print image data; and wherein said reduction print process comprises:
inputting print setting concerning reduction print;
reading an original image and converting the image into image data;
reducing the image data;
compressing the reduced image data and storing the compressed data;
reading the compressed image data and decompressing the data;
preparing print image data based on the decompressed image data; and
printing based on the prepared print image data.

9. The print method according to claim 8, further comprising controlling the compression and decompression timings of the image data in response to a request for the enlargement print process or the reduction print process.

10. A print method, for printing read image data based on specified print setting, comprising:
an enlargement split print process and a reduction integration print process,
wherein said enlargement split print process comprises:
inputting print setting concerning enlargement print;
reading an original image and converting the image into image data;
compressing the image data and storing the compressed data;
reading the compressed image data and decompressing the data;
laying out the decompressed image data across pages;
enlarging the image data on the pages laid out and preparing print image data; and
printing based on the prepared print image data, and
wherein said reduction integration print process comprises:
inputting print setting concerning reduction print;
reading each original image and converting the image into image data;
reducing the image data;
compressing the reduced image data and storing the compressed data;
reading the compressed image data and decompressing the data;
laying out the decompressed image data on one page and preparing print image data; and
printing based on the prepared print image data.

11. The print method according to claim 10, further comprising controlling the compression and decompression timings of the image data in response to a request for the enlargement split print process or the reduction integration print process.

12. A print method according to claim 10, wherein said enlargement split print process further comprises:
determining whether a blank page occurs; and
canceling print of the blank page when it is determined that a blank page occurs between the laying out the decompressed image data and the printing.

13. A computer-readable record medium recording a program for printing read image data based on specified print setting, said program for providing on a computer the functions of:
reading an original image and converting the image into image data;
compressing the read image data and storing the compressed data;
reading the compressed image data and decompressing the data;
performing predetermined image processing for the image data based on the specified print setting, thereby preparing print image data; and
controlling compression and decompression timings of the image data in response to the contents of the image processing.

14. A record medium according to claim 13, wherein the function of compressing the read image data and storing the compressed data is adapted so that a plurality of print qualities can be used and the compression quality to be used can be selected in response to the contents of the image processing.

15. A print system for printing comprising:
an image processor that performs predetermined image processing for image data based on a specified print setting, thereby preparing print image data; and
a control circuit that controls compression and decompression timings of the image data in response to contents of the image processing performed by the image processor.

16. A method for printing comprising:

performing predetermined image processing for image data based on a specified print setting, thereby preparing print image data; and controlling compression and decompression timings of the image data in response to contents of the image processing.

17. A print system, for printing read image data based on a specified print setting, comprising:

means for specifying a print setting;

an input portion for inputting image data;

means for performing predetermined image processing for the input image data based on the specified print setting;

means for compressing one of the input image data and the processed image data, and storing the compressed data in storage means;

means for reading the compressed image data from the storage means and decompressing the data; and control means for controlling the timing, of the compression and decompression, in response to a type of the image processing performed.

18. The print system according to claim 17, wherein, when the specified print setting indicates that an image layout is not required, the image processing is performed so that print image data, based on the input image data, is prepared without the compressing and decompressing.

* * * * *